F. BURNS.

KNITTING-MACHINE NEEDLES.

No. 7,505. Reissued Feb. 13, 1877.

Witnesses.

L. H. Latimer.

W. J. Pratt.

Inventor.

Frank Burns per Lemby & Gregory Att'ys.

N. PETERS, PHOTO-LITHOGRAPHER, WASHINGTON, D. C.

UNITED STATES PATENT OFFICE.

FRANK BURNS, OF WALTHAM, MASSACHUSETTS.

IMPROVEMENT IN KNITTING-MACHINE NEEDLES.

Specification forming part of Letters Patent No. 184,833, dated November 28, 1876; reissue No. 7,505, dated February 13, 1877; application filed January 4, 1877.

*To all whom it may concern:*

Be it known that I, FRANK BURNS, of Waltham, in the county of Middlesex and State of Massachusetts, have invented certain new and useful Improvements in Knitting-Machine Needles, of which the following is a full and clear description, reference being had to the accompanying drawing, and to the letters of reference marked thereon, making a part of this specification.

The invention has reference to the class of latched needles, and consists in a needle substantially as hereinafter described, as a new article of manufacture, the latch being pivoted upon a bearing or bearings forming integral portions of the side walls of the needle, such bearing or bearings entering an opening in the base of the latch. Also, in the method herein described of forming the bearings for the latch and securing it in position.

In order to enable others skilled in the art to which my invention appertains to make and use the same, I will now proceed to describe its construction and operation, referring to the annexed drawing, in which—

Figure 1:
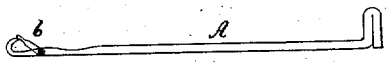
Figure 4:
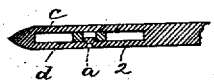
Figure 2:
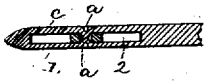
Figure 3:
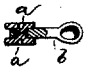
Figure 5:
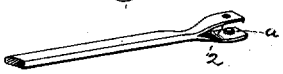
Figure 6:
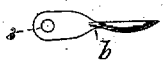

Figure 1 is a side view of a knitting-machine needle embodying my invention. Figs. 2, 3, and 4 are enlarged sections thereof. Fig. 5 represents one of the improved needles broken away to show the latch-bearings, and Fig. 6 a separate latch.

A represents the shank of an ordinary knitting-machine needle, and *b* is the latch thereof, constructed in any of the known and usual ways.

Ordinarily the latch is held in the slot and between the side walls of the needle-shank by means of a rivet extended through the side walls and latch, the latter turning thereon. Needles with latches pivoted in this way are objectionable, for the rivets become loose, work out, engage the loops of and damage the fabric. The needles should be thinnest where the latches are pivoted, especially those used in machines employing two sets of needles crossing each other.

The shank A of the needle is of usual shape. The latch *b* is shaped and perforated at its base, as are all ordinary latches. The base of the latch, perforated in the ordinary way, is placed in the opening 2, between the the side walls *c d*, formed by slotting the needle-shank, as usual. When the latch is so placed punches at both sides of the needle are advanced against the outer sides of the side walls *c d*, opposite the opening 3 in the latch-base, where they act to punch bearings *a* from the inner portions of the side walls into the opening in the latch, as shown in Figs. 2 and 3. These bearings *a*, formed by punching or driving a portion of each side wall into the opening in the latch, meet together substantially at the center of the latch, and there abut closely, thereby forming a cylindrical bearing for the latch, upon which it can turn freely.

Fig. 5 represents one of these improved needles broken out after being punched to form the bearings *a*. Instead of forming a bearing from each side wall, I may use one punch, and form a bearing from one side wall only, as in Fig. 4. The bearings or pivotal point for the latch being integral with the needle-body or side wall, cannot, it is obvious, become loose, as happens with the usual rivet, and all liability of injury to the fabric by loose pivots is completely obviated.

In case the latch should get broken or bent out of shape, the side wall can be sprung out and another latch put in without injuring the needle.

This method of securing the latch, besides being effective, improves the quality of the needle, and is less expensive in practice, enabling latches to be connected with the shanks more rapidly and economically.

Having thus fully described my invention, what I claim as new, and desire to secure by Letters Patent, is—

1. As a new article of manufacture, a knitting-machine needle, composed of a perforated latch, combined with a needle-shank having a bearing or bearings for the latch formed as an integral portion of the side wall or walls, substantially as described.

2. The method herein described of securing the latch in a knitting-machine needle, consisting in forcing a portion of the metal from one or both side walls into the opening made through the base of the latch, to form a bearing for and hold the turning-latch in place, substantially as described.

FRANK BURNS.

Witnesses:

GEO. W. GREGORY,

ELMER C. PERKINS.